(12) United States Patent
Yoshimura et al.

(10) Patent No.: US 11,085,393 B2
(45) Date of Patent: Aug. 10, 2021

(54) CONTROL METHOD AND CONTROL DEVICE FOR INTERNAL COMBUSTION ENGINE

(71) Applicant: NISSAN MOTOR CO., LTD., Yokohama (JP)

(72) Inventors: Futoshi Yoshimura, Kanagawa (JP); Yoshihiko Iwabuchi, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 0 days.

(21) Appl. No.: 16/614,923

(22) PCT Filed: May 24, 2017

(86) PCT No.: PCT/JP2017/019418
§ 371 (c)(1),
(2) Date: Nov. 19, 2019

(87) PCT Pub. No.: WO2018/216151
PCT Pub. Date: Nov. 29, 2018

(65) Prior Publication Data
US 2020/0408165 A1     Dec. 31, 2020

(51) Int. Cl.
*F02B 75/04*     (2006.01)
*F02D 41/38*     (2006.01)
(Continued)

(52) U.S. Cl.
CPC ......... *F02D 41/3836* (2013.01); *F02D 15/00* (2013.01); *F02D 41/062* (2013.01);
(Continued)

(58) Field of Classification Search
CPC ... Y02T 10/12; F02D 41/3836; F02D 41/062; F02D 15/00; F02M 61/16
See application file for complete search history.

(56) References Cited

U.S. PATENT DOCUMENTS 5,918,578 A * 7/1999 Oda ........................ F02D 41/22
                                                    123/456
6,505,599 B1   1/2003 Mashiki et al.
(Continued)

FOREIGN PATENT DOCUMENTS

JP   2001-152931 A   6/2001
JP   2004-245185 A   9/2004
(Continued)

*Primary Examiner* — Gonzalo Laguarda
(74) *Attorney, Agent, or Firm* — Foley & Lardner LLP

(57) ABSTRACT

A control method for internal combustion engine with a fuel injection valve configured to directly inject fuel into a cylinder and an ignition plug configured to directly spark-ignite the fuel injected from the fuel injection valve includes comparing an actual behavior, which is an actual changing behavior of an engine revolution speed at an engine start, to a reference behavior set in advance, and switching from stratified combustion in which a fuel spray injected from the fuel injection valve and staying around the ignition plug is directly spark-ignited to homogeneous combustion in which a homogeneous air-fuel mixture is formed in a combustion chamber and the fuel is burned and increasing a mechanical compression ratio of the internal combustion engine as compared to the case where the actual behavior and the reference behavior match if the actual behavior is different from the reference behavior.

4 Claims, 14 Drawing Sheets

(51) Int. Cl.
*F02D 15/00* (2006.01)
*F02D 41/06* (2006.01)
*F02M 61/16* (2006.01)

(52) U.S. Cl.
CPC ....... *F02M 61/16* (2013.01); *F02D 2041/389* (2013.01); *F02D 2200/101* (2013.01); *F02M 2200/06* (2013.01)

(56) References Cited

U.S. PATENT DOCUMENTS

| | | | | |
|---|---|---|---|---|
| 7,331,333 | B2* | 2/2008 | Maitani | F02D 41/064 |
| | | | | 123/179.17 |
| 8,234,054 | B2* | 7/2012 | Nakasaka | F02D 41/0002 |
| | | | | 701/113 |
| 8,342,143 | B2* | 1/2013 | Yoshioka | F02D 41/0025 |
| | | | | 123/48 R |
| 2018/0163687 | A1 | 6/2018 | Tanaka et al. | |
| 2018/0363547 | A1* | 12/2018 | Nakamura | F02B 75/048 |
| 2020/0240349 | A1* | 7/2020 | Ueno | F02D 41/3005 |

FOREIGN PATENT DOCUMENTS

| | | |
|---|---|---|
| JP | 2005-54758 A | 3/2005 |
| JP | 2005-113884 A | 4/2005 |
| JP | 2005-163755 A | 6/2005 |
| JP | 2017-57798 A | 3/2017 |
| WO | WO-2016/194184 A1 | 12/2016 |

* cited by examiner

CONTROL METHOD AND CONTROL DEVICE FOR INTERNAL COMBUSTION ENGINE

TECHNICAL FIELD

The present invention relates to a control method and a control device for internal combustion engine with a fuel injection valve for directly injecting fuel into a cylinder and an ignition plug for directly spark-igniting the fuel injected from the fuel injection valve.

BACKGROUND ART

A fast idle control is known which forms a stratified air-fuel mixture around an ignition plug at a cold start of an internal combustion engine and performs stratified combustion by retarding an ignition timing to a compression top dead center or later. The stratified combustion can increase an exhaust temperature by drastically retarding the ignition timing and is, therefore, effective in activating an exhaust gas purifying catalyst at an early stage.

A wall guide method for forming a stratified air-fuel mixture around an ignition plug by causing a cavity provided in a piston to reflect a fuel spray has been conventionally a method for forming a stratified air-fuel mixture around an ignition plug. However, in the wall guide method, part of the colliding fuel easily remains on a top surface of the piston and the remaining fuel may be burned to produce soot. Thus, in recent years in which there is an increasing request for emission performance, attention has been attracted to a spray guide method for forming a stratified air-fuel mixture by injecting fuel toward the periphery of the ignition plug.

However, in a so-called direct fuel injection engine in which fuel is directly injected into a cylinder, the tip of a fuel injection valve is exposed in a combustion chamber and easily affected by combustion in the cylinder. Thus, an actual spray pattern deviates from a pattern at the time of designing (hereinafter, also referred to as a reference pattern) due to a change over time. In the wall guide method, even if there is a slight deviation of the spray pattern, a fuel spray advances to the periphery of the ignition plug if the fuel spray collides with the cavity. In contrast, the spray guide method does not have a function of correcting a deviation of the spray pattern unlike the wall guide method. Thus, in the spray guide method, it becomes difficult to ensure combustion stability if the spray pattern deviates from the reference pattern.

A control for switching to homogeneous combustion by prohibiting stratified combustion if a specific condition is satisfied is disclosed as a control for solving this problem in JP 2001-152931A1.

SUMMARY OF INVENTION

In the case of the homogenous combustion, a combustion stability cannot be ensured if the ignition timing is drastically retarded as in the case of the stratified combustion. Thus, a retardation amount of the ignition timing is limited as compared to the case of the stratified combustion. Specifically, in the case of the homogenous combustion, an exhaust temperature cannot be increased as compared to the case of the stratified combustion. Thus, if a switch is made from the stratified combustion to the homogeneous combustion as in the above literature, emission performance is deteriorated due to a delay in the activation of the exhaust gas purifying catalyst. However, in the above literature, no measure is taken to suppress the deterioration of emission performance due to a switch to the homogeneous combustion.

Accordingly, the present invention aims to suppress the deterioration of emission performance even in the case of performing homogeneous combustion by prohibiting stratified combustion in a fast idle control.

According to one embodiment of this invention, a control method for internal combustion engine with a fuel injection valve configured to directly inject fuel into a cylinder; and an ignition plug configured to directly spark-ignite the fuel injected from the fuel injection is provided. In the control method, an actual changing behavior that is the behavior of the actual change of the engine rotational speed at the time of engine start is compared with a reference behavior set in advance. Then, when the actual behavior is different from the reference behavior, a stratified combustion in which a fuel spray injected from the fuel injection valve and staying around the ignition plug is directly spark-ignited is switched to a homogeneous combustion in which a homogeneous air-fuel mixture is formed in a combustion chamber and the fuel is burned, and a mechanical compression ratio of the internal combustion engine is increased compared to the case where the actual behavior and the reference behavior match.

DESCRIPTION OF EMBODIMENT

Hereinafter, an embodiment of the present invention is described with reference to the accompanying drawings.

Figure 1:
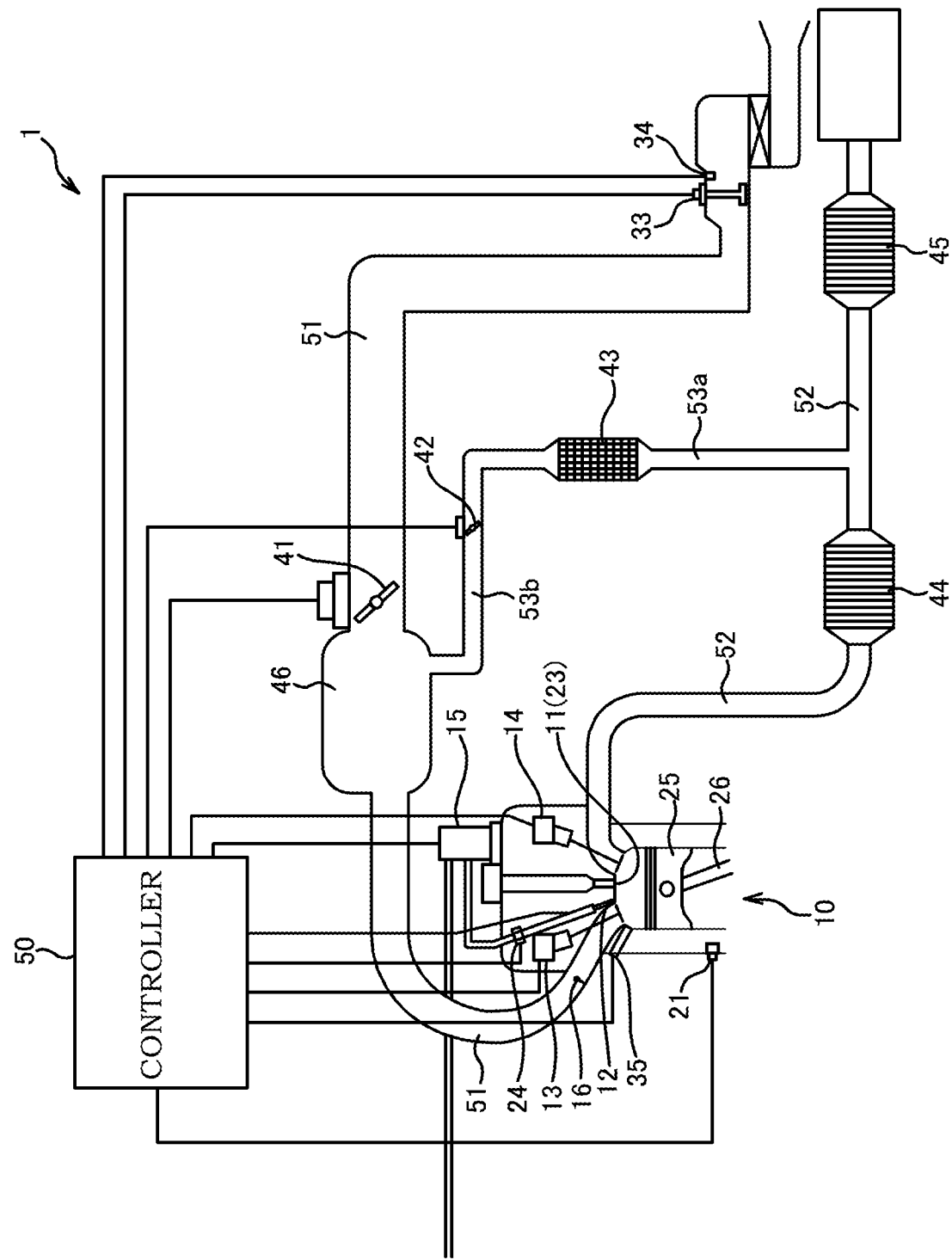
FIG. 1 is a diagram of an overall configuration of an internal combustion engine system.

FIG. 1 is a diagram of an overall configuration of an internal combustion engine system. In the internal combustion engine system 1, an internal combustion engine 10 is connected to an intake passage 51. Further, the internal combustion engine 10 is connected to an exhaust passage 52.

A tumble control valve 16 is provided in the intake passage 51. The tumble control valve 16 generates a tumble flow in a cylinder by closing a part of a flow passage cross-section of the intake passage 51.

A collector tank 46 is provided in the intake passage 51. An EGR passage 53b is also connected to the collector tank 46.

An air flow meter 33 is provided in the intake passage 51. A controller 50 connected to the air flow meter 33 obtains an intake air amount in the intake passage 51 from the air flow meter 33. Further, an intake air temperature sensor 34 is provided in the intake passage 51. The controller 50 connected to the intake air temperature sensor 34 obtains a temperature of air passing in the intake passage 51 from the intake air temperature sensor 34.

Further, an electronically controlled throttle 41 is provided in the intake passage 51 and a throttle opening is controlled by the controller 50.

Exhaust gas purifying catalysts 44, 45 for purifying exhaust gas are provided in the exhaust passage 52. Three-way catalysts or the like are used as the exhaust gas purifying catalysts 44, 45. Further, the exhaust passage 52 is branched at an intermediate position thereof into an EGR passage 53 connected to the collector tank 46.

An EGR cooler 43 is provided in the EGR passage 53. Further, an EGR valve 42 is provided in the EGR passage 53. The EGR valve 42 is connected to the controller 50. According to operating conditions of the internal combustion engine 10, an opening of the EGR valve 42 is controlled by the controller 50.

The internal combustion engine 10 includes an ignition plug 11, a fuel injection valve 12, an intake-side valve timing control mechanism 13, an exhaust-side valve timing control mechanism 14 and a fuel injection pump 15. The fuel injection valve 12 is a direct injection valve and is provided near the ignition plug 11.

The ignition plug 11 performs spark ignition in a combustion chamber of the internal combustion engine 10. The ignition plug 11 is connected to the controller 50 and the controller 50 serving as a control unit controls a spark ignition timing. The ignition plug 11 also operates as a flow velocity sensor 23 as described later. A method for detecting a flow velocity is described later.

The fuel injection valve 12 directly injects fuel into the combustion chamber of the internal combustion engine 10. The fuel injection valve 12 is connected to the controller 50 and the controller 50 serving as the control unit controls a fuel injection timing. In the present embodiment, so-called multi-stage injection is performed where the fuel is injected a plurality of times including an intake stroke. The fuel injection pump 15 supplies the pressurized fuel to a fuel supply pipe connected to this fuel injection valve 12.

The intake-side valve timing control mechanism 13 changes opening and closing timings of an intake valve. The exhaust-side valve timing control mechanism 14 changes opening and closing timings of an exhaust valve. The intake-side valve timing control mechanism 13 and the exhaust-side valve timing control mechanism 14 are connected to the controller 50. Opening and closing timings of these mechanisms are controlled by the controller 50. It should be noted that although the intake-side valve timing control mechanism 13 and the exhaust-side valve timing control mechanism 14 are shown here, either one of these may be provided.

Unillustrated crank angle sensor and in-cylinder pressure sensor are provided in the internal combustion engine 10. The crank angle sensor detects a crank angle in the internal combustion engine 10. The crank angle sensor is connected to the controller 50 and sends the crank angle of the internal combustion engine 10 to the controller 50.

The in-cylinder pressure sensor detects a combustion chamber pressure in the internal combustion engine 10. The in-cylinder pressure sensor is connected to the controller 50. The combustion chamber pressure in the internal combustion engine 10 is sent to the controller 50.

Further, the internal combustion engine 10 may include a knock sensor 21 and a fuel pressure sensor 24. The controller 50 reads outputs from various sensors described above and unillustrated other sensors and controls the ignition timing, valve timings, an air-fuel ratio and the like on the basis of these. It should be noted that the internal combustion engine 10 includes a variable compression ratio control mechanism for changing a mechanical compression ratio and the controller 50 also controls this variable compression ratio control mechanism. The details of the variable compression ratio control mechanism are described later.

Figure 2:
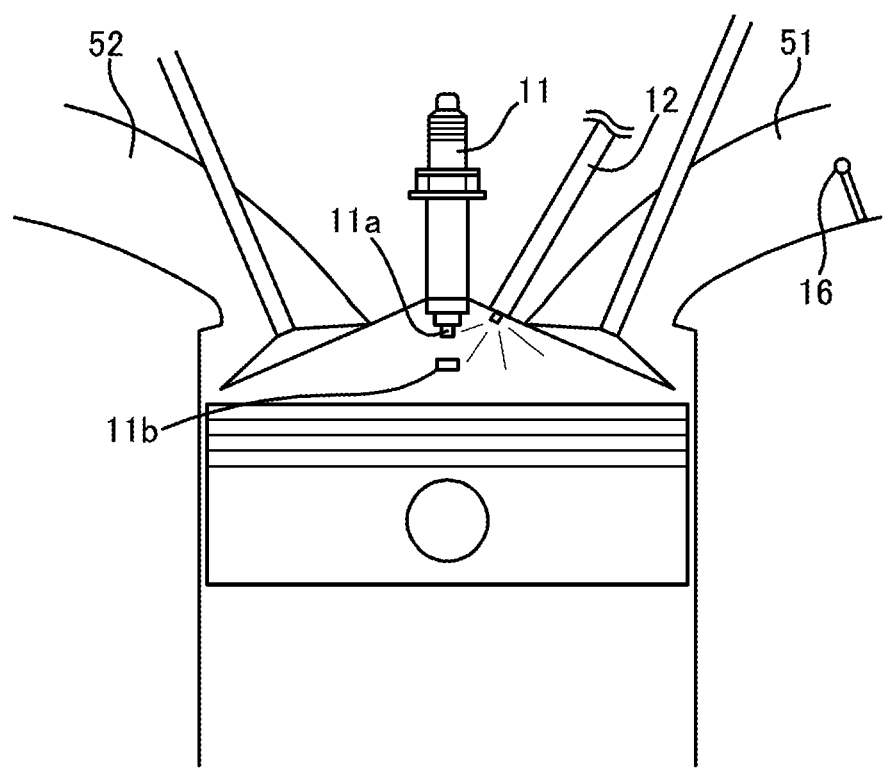
FIG. 2 is a diagram showing how a flow is given near a plug.

FIG. 2 is a diagram showing a positional relationship of the ignition plug 11 and the fuel injection valve 12. As described above, the fuel injection valve 12 is a direct injection valve and is provided near the ignition plug 11. Thus, part of the injected fuel passes near a discharge gap, whereby a flow can be given near the ignition plug. It should be noted that how the flow is given is described later.

Figure 3:
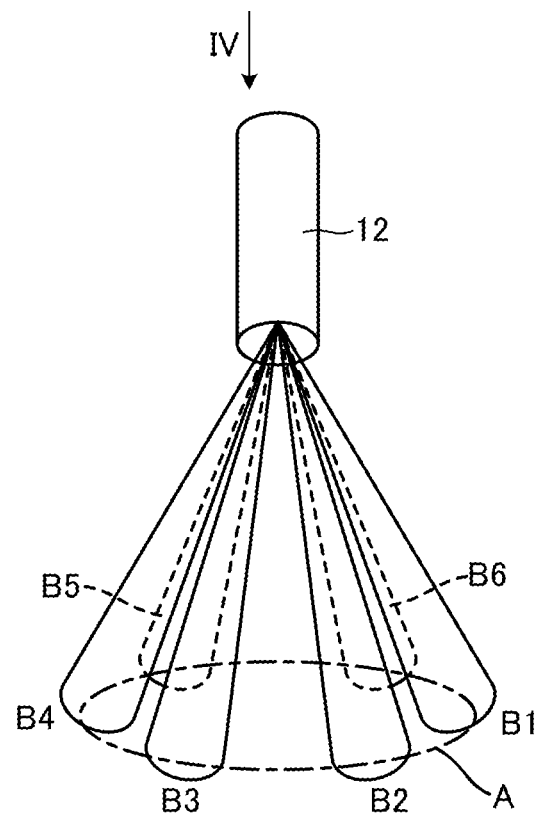
FIG. 3 is a diagram showing an injection mode of a fuel injection valve.
Figure 4:
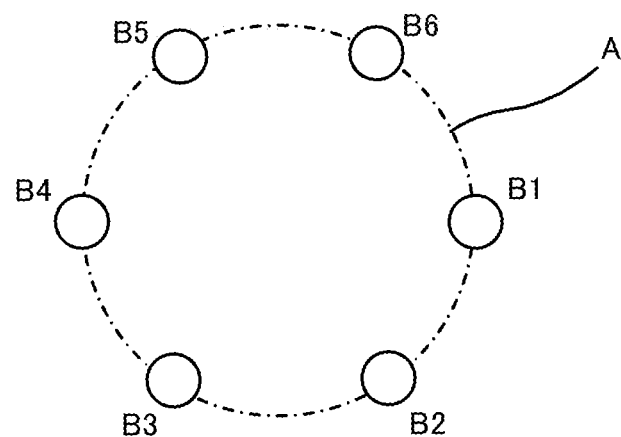
FIG. 4 is a diagram showing spray beams.

FIG. 3 shows a mode of fuel sprays injected from the fuel injection valve 12. FIG. 4 is a view of a plane including a circle A of FIG. 3 viewed from a direction of an arrow IV of FIG. 3.

The fuel injection valve 12 of the present embodiment injects the fuel from six injection holes. If B1 to B6 denote fuel sprays (hereinafter, also referred to as spray beams) injected from the six injection holes, each spray beam has such a conical shape that a spray cross-section becomes larger with distance from the injection hole. Further, cross-sections of the spray beams B1 to B6 cut by the plane including the circle A are arranged at equal intervals in an annular manner as shown in FIG. 4.

Figure 5:
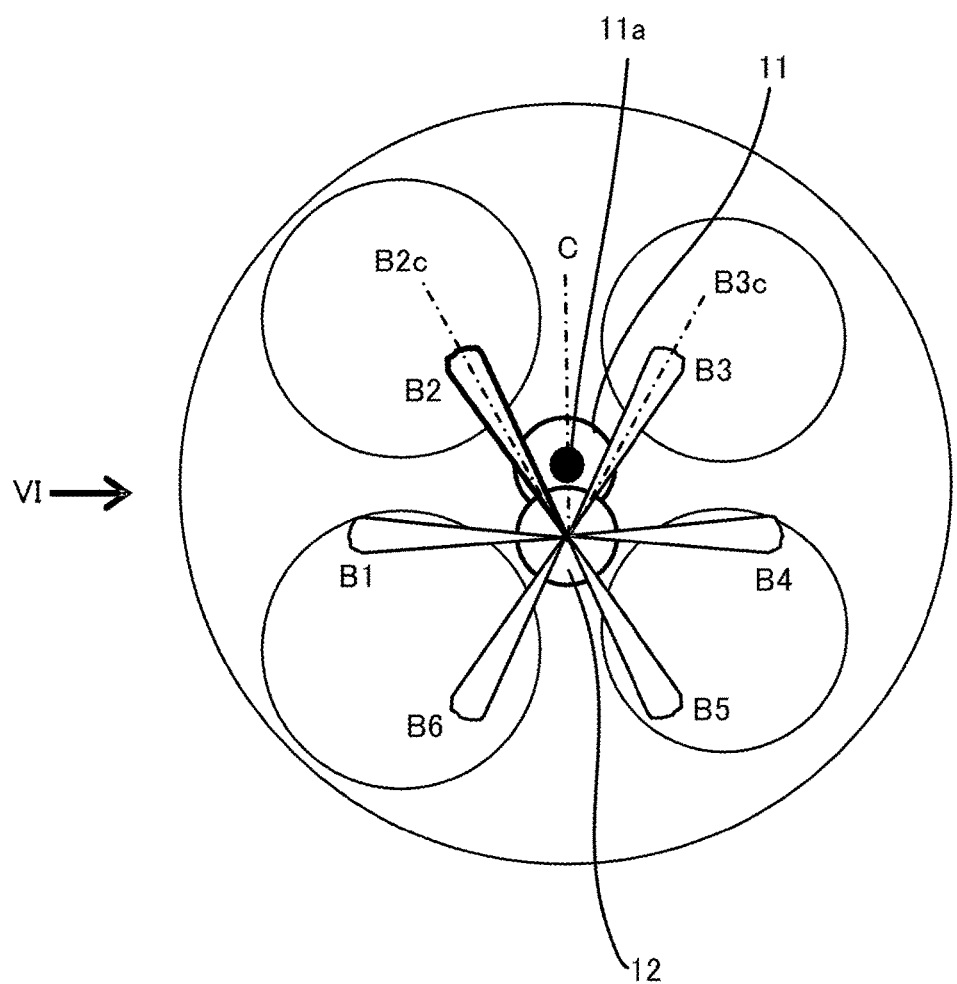
FIG. 5 is a diagram showing the arrangement of an ignition plug and the fuel injection valve.

FIG. 5 is a diagram showing a positional relationship of the spray beams B1 to B6 and the ignition plug 11. The fuel injection valve 12 is arranged on a dashed-dotted line C, which is a bisector of an angle formed between a center axis B2c of the spray beam B2 and a center axis B3c of the spray beam B3.

Figure 6:
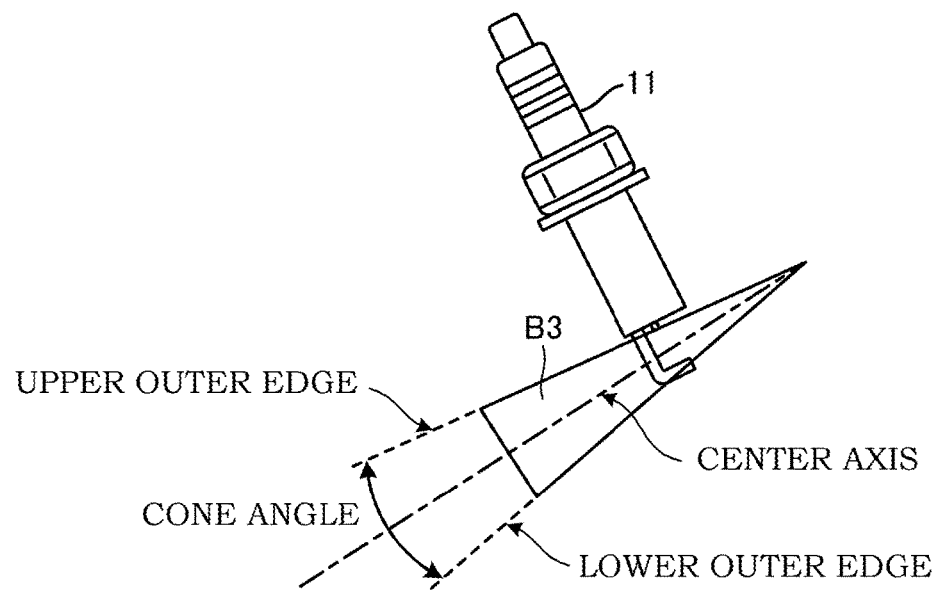
FIG. 6 is a diagram showing a relationship of a discharge region and a spray beam.

FIG. 6 is a diagram showing a positional relationship of the ignition plug 11 and the spray beam B3 when FIG. 5 is viewed from a direction of an arrow VI. In FIG. 6, a discharge region sandwiched by a center electrode 11a and an outer electrode 11b is arranged in a range sandwiched by upper and lower outer edges of the spray beam B3 in FIG. 6. It should be noted that, although not shown, a positional relationship of the ignition plug 11 and the spray beam B2 is symmetrical with that in FIG. 6 and the discharge region is arranged in a range sandwiched by upper and lower outer edges of the spray beam B2 when FIG. 5 is viewed from a direction opposite to the direction of the arrow VI. Specifically, the ignition plug 11 is so arranged that the discharge region is arranged in a range sandwiched by a plane including the upper outer edge of the spray beam B2 and that of the spray beam B3 and a plane including the lower outer edge of the spray beam B2 and that of the spray beam B3.

Figure 7:
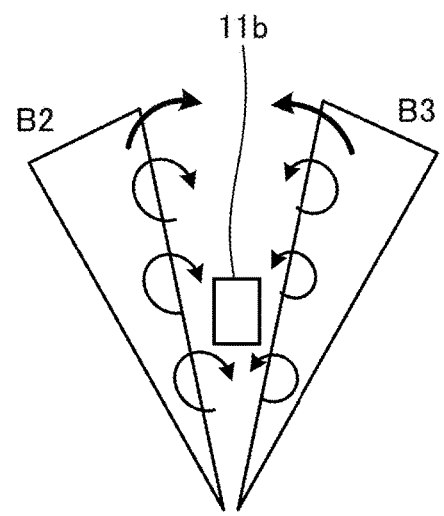
FIG. 7 is a diagram showing a contraction flow.

FIG. 7 is a diagram showing an effect when the spray beams B1 to B6 and the ignition plug 11 are in the positional relationship shown in FIGS. 5 and 6.

The fuel injected from the fuel injection valve 12 is broken up into droplets to become sprays and moves forward while taking in air around as indicated by bold arrows in FIG. 7. In this way, air flow turbulence is generated around the sprays.

Further, if an object (including fluid) is present around, the fluid is attracted to the object and flows along the object by the so-called Coanda effect. Specifically, a so-called contraction flow in which the spray beams B2 and B3 attract each other as shown by thin line arrows of FIG. 7 is generated. Since very strong turbulence is generated between the spray beams B2 and B3 in this way, turbulence intensity around the ignition plug 11 increases.

Here, an intensity change of the tumble flow is described.

Figure 8:
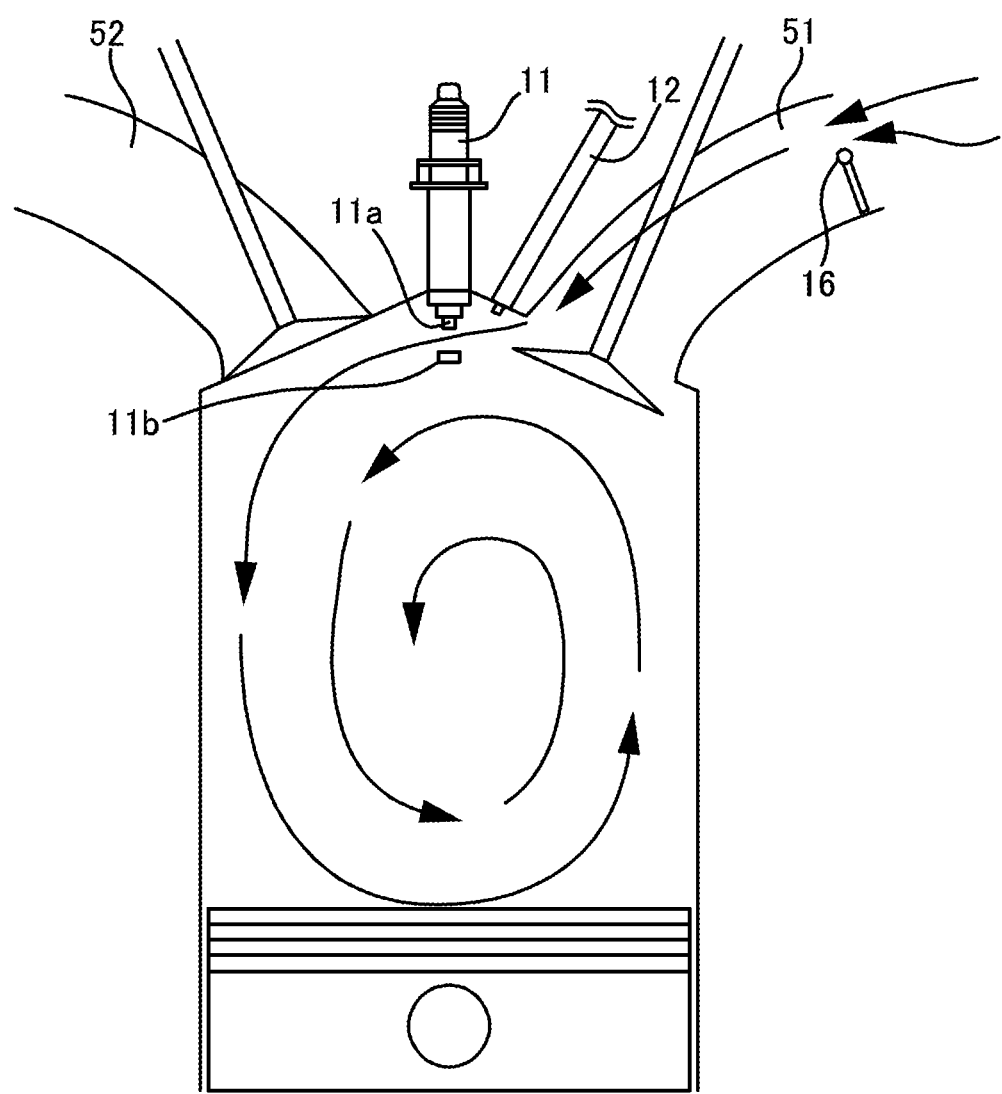
FIG. 8 is a diagram of a tumble flow generated in a cylinder.
Figure 9:
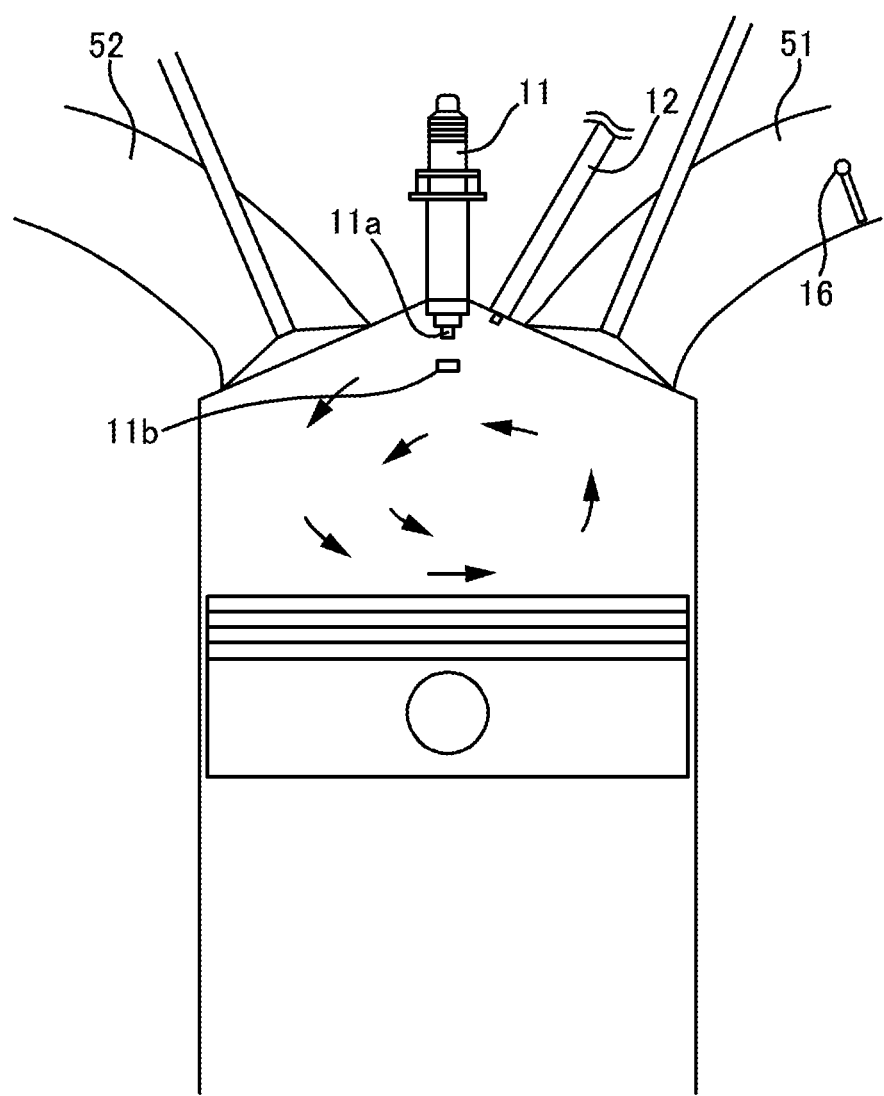
FIG. 9 is a diagram of a tumble flow during a compression stroke.

FIG. 8 is a diagram of the tumble flow generated in the cylinder. FIG. 9 is a diagram of tumble flow collapse. In FIGS. 8 and 9, the intake passage 51, the exhaust passage 52, the ignition plug 11, the fuel injection valve 12 and the tumble control valve 16 are shown. Further, the center electrode 11a and the outer electrode 11b of the ignition plug 11 are shown. Furthermore, a tumble flow in the cylinder in the intake stroke is shown by arrows in FIG. 8. A tumble flow in the cylinder in a compression stroke is shown in by arrows in FIG. 9.

If the tumble control valve 16 is closed in the intake stroke, intake air flows in a manner biased toward an upper side of the intake passage 51 in FIG. 8 and flows into the cylinder. As a result, the tumble flow swirling in a vertical direction is formed in the cylinder as shown. Thereafter, the combustion chamber in the cylinder becomes narrower due to an upward movement of a piston in the compression stroke. When the combustion chamber becomes narrower, the tumble flow is squashed, gradually becomes incapable of maintaining the fluidity thereof (FIG. 9) and eventually collapses.

Accordingly, in the case of executing a stratified fast idle control (hereinafter, also referred to as a stratified FIR control) for forming a stratified air-fuel mixture around the ignition plug 11 and retarding the ignition timing to a compression top dead center or later, the flow around the ignition plug 11 is weakened at the time of plug ignition. Thus, an arc (hereinafter, also referred to as a plug discharge channel CN) generated between the electrodes 11a and 11b of the ignition plug 11 does not sufficiently elongate and accidental fire and partial burn easily occur.

Accordingly, in the present embodiment, a situation is created where the plug discharge channel CN elongates after the collapse of the tumble flow, utilizing a property such that increasing turbulence intensity around the ignition plug 11 is increased by injecting the fuel.

Figure 10:
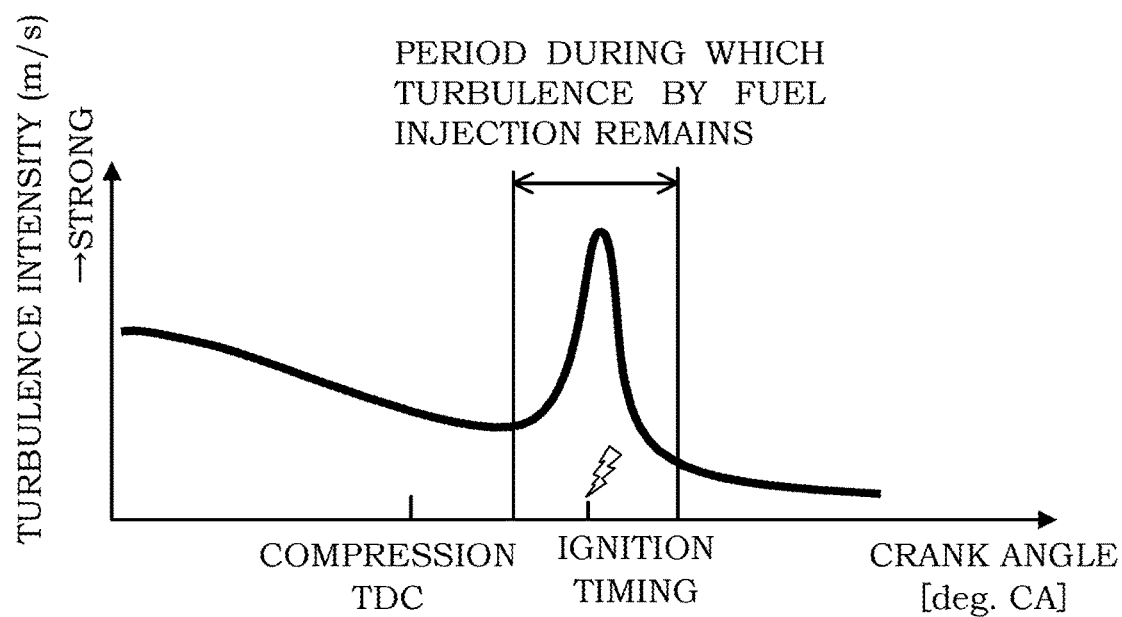
FIG. 10 is a graph showing a change of turbulence intensity around the ignition plug.

FIG. 10 is a timing chart showing a turbulence intensity change around the ignition plug 11 when the fuel was injected after the compression top dead center. A horizontal axis of FIG. 10 represents the crank angle and a vertical axis thereof represents the turbulence intensity around the ignition plug 11. Since the intensity of the tumble flow gradually decreases as described above, the turbulence intensity around the ignition plug 11 also decreases according to this. However, if the fuel is injected after the compression top dead center, the turbulence intensity is enhanced for a predetermined period after the fuel injection. During this period in which the turbulence intensity is increased by the fuel injection, the plug discharge channel CN easily elongates. Particularly, a timing at which the turbulence intensity is peaked is suitable as the ignition timing.

Figure 11:
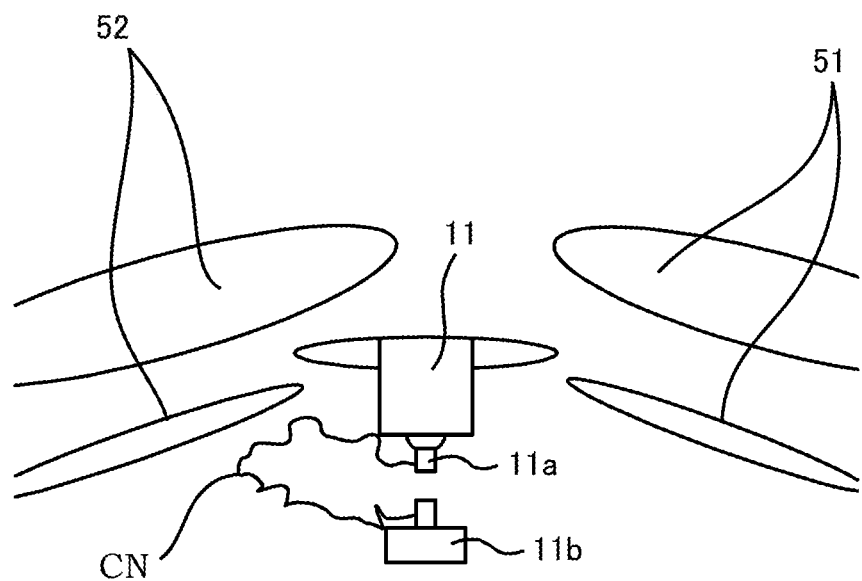
FIG. 11 is a diagram of a plug discharge channel near the ignition plug.

FIG. 11 is a diagram of the plug discharge channel CN. The center electrode 11a and the outer electrode 11b of the ignition plug 11 and the elongated plug discharge channel CN are shown in FIG. 11. Further, the fuel injection valve 12 is omitted here to focus on a state of the plug discharge channel CN. It should be noted that if a flow is given near the ignition plug to sufficiently elongate the plug discharge channel CN, the tip of the fuel injection valve 12 may not necessarily be oriented toward the ignition plug 11. An embodiment may be such that the fuel is reflected in the combustion chamber to give a flow near the ignition plug even if the tip of the fuel injection valve 12 is oriented in a different direction.

The flow near the ignition plug 11 after the collapse of the tumble flow is small. Thus, if spark ignition is performed, the plug discharge channel CN is normally generated to substantially linearly straddle between the center electrode 11a and the outer electrode 11b. However, in the present embodiment, the flow is given near the ignition plug 11 by the fuel injection by the fuel injection valve 12 until the plug discharge channel CN is generated after the collapse of the tumble flow. By the given flow, the plug discharge channel CN between the center electrode 11a and the outer electrode 11b is elongated as shown in FIG. 11.

Since the flow can be given in the combustion chamber after the collapse of the tumble flow and the plug discharge channel CN can be elongated by doing so, it is possible to suppress partial burn and accidental fire and improve combustion stability. Particularly, spark ignition can be stably performed also under a situation where flame propagation combustion is less likely to occur than normal such as in the case of using EGR and in the case of adopting lean burn as described later.

Figure 12A:
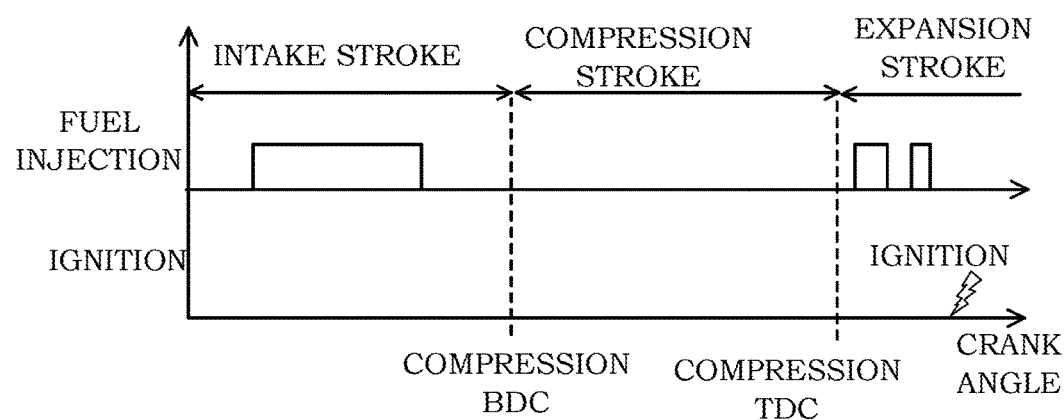
FIG. 12A is a chart showing a relationship of a fuel injection timing and an ignition timing.
Figure 12B:
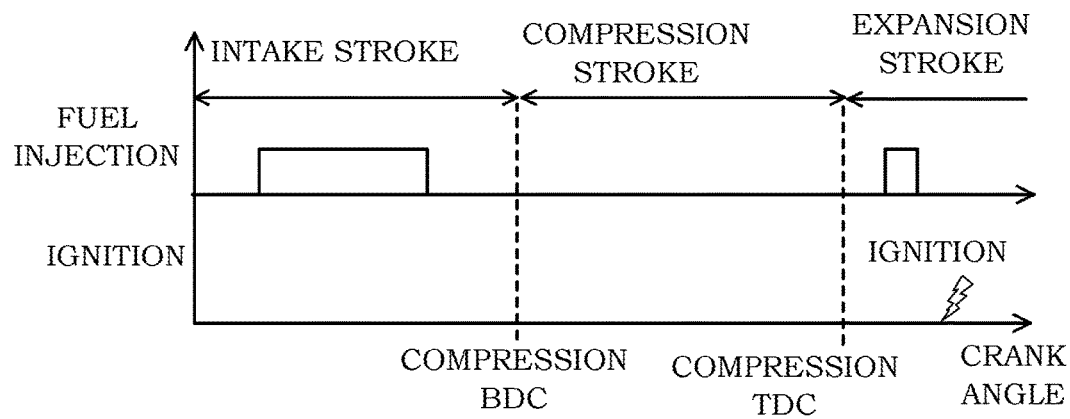
FIG. 12B is a chart showing a relationship of the fuel injection timing and the ignition timing.

FIGS. 12A and 12B are charts showing examples of a fuel injection pattern for elongating the plug discharge channel CN. Fuel injection may be further performed until the generation of the plug discharge channel after the collapse of the tumble flow (FIG. 12A) or multi-stage expansion stroke injection may be performed until the generation of the plug discharge channel after the collapse of the tumble flow (FIG. 12B) in addition to the aforementioned intake stroke and expansion stroke in which multi-stage injection is performed.

Figure 13:
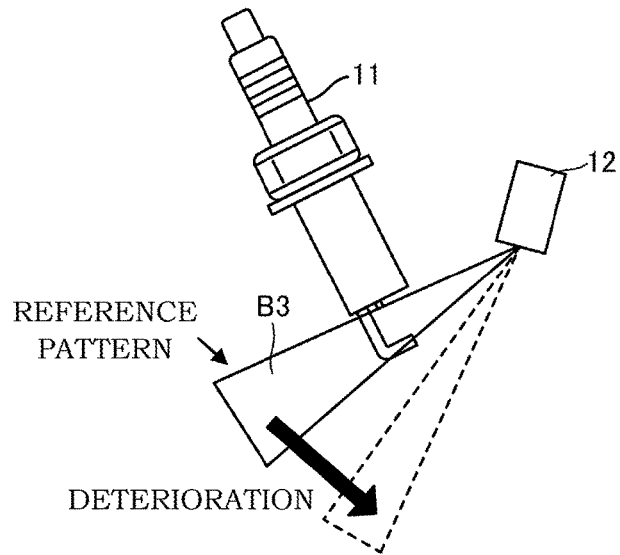
FIG. 13 is a diagram showing the position of the ignition plug and a combustion stability.

Since the fuel injection valve 12 for directly injecting the fuel into the cylinder is exposed to combustion flame and combustion gas, so-called deposits are easily accumulated around the injection holes. If the deposits close the course of the fuel spray, the spray pattern such as the shape and propagation direction of the spray beam deviates from the reference pattern set to enhance flow intensity around the ignition plug 11 by the fuel injection, for example, as shown in FIG. 13. As a result, even if the fuel is injected, a combustion stability during the stratified FIR control may be reduced without enhancing the flow intensity around the ignition plug 11.

Further, an exhaust temperature during the stratified FIR control may not reach a target exhaust temperature due to a reduction in the combustion stability. Here, a relationship between the combustion stability and the exhaust temperature is described.

Figure 14:
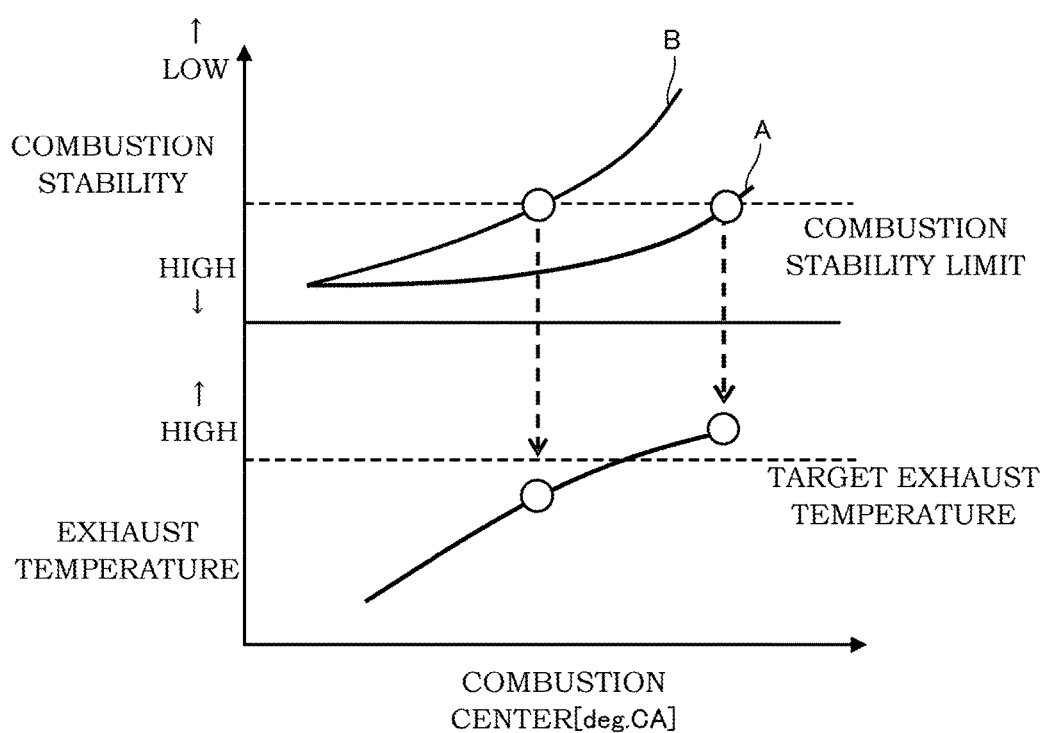
FIG. 14 is a graph showing a relationship of the position of the ignition plug and the combustion stability.

FIG. 14 is a graph showing the relationship between the combustion stability and the exhaust temperature. A horizontal axis of FIG. 14 represents the position of a center of gravity of combustion [deg.CA]. "Combustion stability limit" in FIG. 14 is a combustion stability when noise and vibration are at upper limit values permissible by a passenger. A target exhaust temperature in FIG. 14 is a target value of the exhaust temperature during the stratified FIR control and a value set from a perspective of activating the exhaust gas purifying catalysts 44, 45 at an early stage. A solid line A in FIG. 14 represents a case of the aforementioned reference pattern and a solid line B represents a case deviated from the reference pattern.

As shown in FIG. 14, the exhaust temperature is known to increase as the center of gravity of combustion approaches a retarded side. On the other hand, the combustion stability decreases as the center of gravity of combustion approaches the retarded side. In the reference pattern (solid line A), the combustion stability can be ensured up to a more retarded side by the elongation of the aforementioned plug discharge channel CN. When the combustion stability limit is reached, the exhaust temperature is equal to or higher than the target exhaust temperature.

In contrast, upon deviation from the reference pattern, the combustion stability limit is more on an advanced side as compared to the reference pattern. Thus, if the combustion stability exhibits a characteristic, for example, as represented by the solid line B, the exhaust temperature at the combustion stability limit becomes lower than the target exhaust temperature.

Accordingly, if the combustion stability cannot be ensured in the stratified FIR control, a certain measure needs to be taken. For example, it is considered to switch the FIR control to a control for burning the fuel by forming a homogeneous air-fuel mixture in the combustion chamber (hereinafter, also referred to as a homogeneous FIR control). However, in the case of homogeneous combustion, the combustion stability is reduced if the ignition timing is drastically retarded as in the case of stratified combustion. Thus, the exhaust temperature cannot be sufficiently increased merely by switching to the homogeneous FIR control and emission performance may be deteriorated.

Accordingly, in the present embodiment, the controller 50 executes a control described below to suppress the deterioration of the emission performance while ensuring the combustion stability.

It should be noted that the present inventors think that a change of the fuel spray pattern due to the aforementioned accumulation of deposits is a main cause of being not able to ensure the combustion stability in the stratified FIR control, but a possibility of other causes is not denied.

Figure 15:
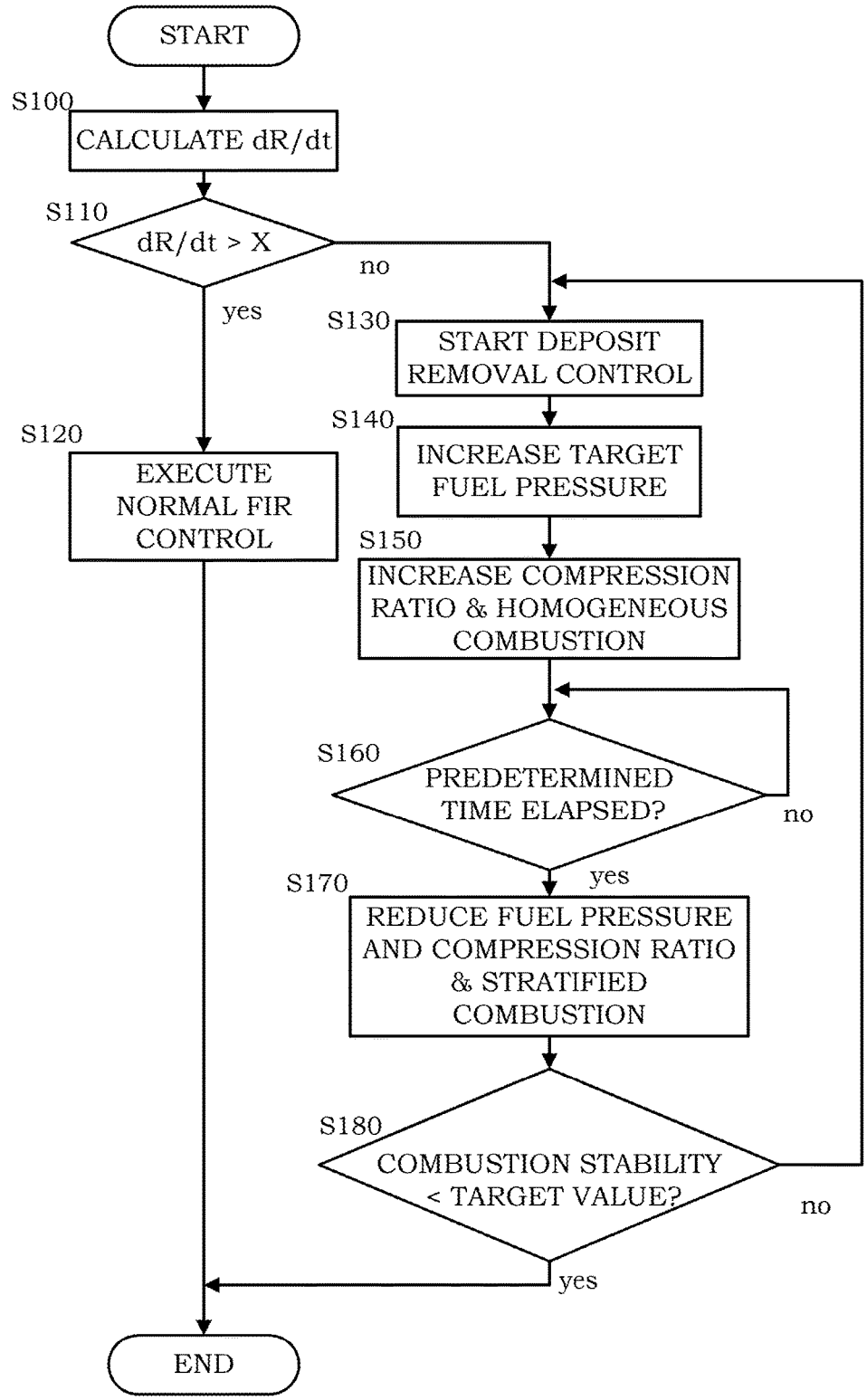
FIG. 15 is a flow chart showing a control routine executed by a controller.

FIG. 15 is a flow chart showing a control routine executed by the controller 50. The controller 50 is programmed to execute this control routine. This routine is executed at a cold start of the internal combustion engine 10. This routine is described below in accordance with Steps.

In Step S100, the controller 50 calculates dR/dt, which is an upward gradient of an engine revolution speed after the internal combustion engine 10 starts combustion, using a detection value of the crank angle sensor.

In Step S110, the controller 50 determines whether or not dR/dt obtained in Step S100 is larger than a threshold value X serving as a reference behavior. If the spray pattern changes due to the accumulation of deposits, the combustion stability is reduced as compared to the case where no deposit is accumulated. Thus, a delay in initial combustion and an output reduction are caused, with the result that the engine revolution speed slowly increases. Accordingly, in Step S110, whether or not any deposit is accumulated on the tip of the fuel injection valve 12 is determined using dR/dt. The threshold value X is a value smaller than the upward gradient of the engine revolution speed after the start of the combustion by a predetermined amount in a state where no deposit is accumulated on the fuel injection valve 12. The value smaller by the predetermined amount is used because a reduction in the combustion stability is permissible if the exhaust temperature when the combustion stability reaches the combustion stability limit is equal to or higher than the target exhaust temperature. Thus, the predetermined amount is determined on the basis of a characteristic of the change of the combustion stability due to the accumulation of deposits. It should be noted that a parameter used to determine whether or not any deposit is accumulated is not limited to dR/dt. Parameters other than dR/dt are described later.

The controller 50 performs a processing of Step S120 if dR/dt is determined to be larger than the threshold value X in Step S110 and performs a processing of Step S130 if dR/dt is determined to be equal to or smaller than the threshold value X.

In Step S120, the controller 50 executes a normal FIR control. The normal FIR control mentioned here is the stratified FIR control in which a deposit removal control to be described later is not executed. It should be noted that a stratified combustion control for start is executed until a processing of this Step is performed after the start of cranking. The stratified combustion control for start is different from the stratified FIR control in that the ignition timing is not retarded.

The controller 50 determines the start of the deposit removal control in Step S130 and sets a target value of a fuel injection pressure (hereinafter, also referred to as a target fuel pressure) larger than that when the deposit removal control is not executed in Step S140. The target fuel pressure is increased to enhance a fuel flow velocity near the injection holes of the fuel injection valve 12 and thereby blow off deposits. It should be noted that the increased target fuel pressure may be, for example, a maximum fuel pressure realizable by the fuel injection pump 15 or may be a fuel pressure which is obtained by an experiment or the like and at which the deposits can be blown off.

In Step S150, the controller 50 increases the mechanical compression ratio of the internal combustion engine 10 and switches from the stratified combustion control for start to the homogeneous FIR control.

Here, an increase of the mechanical compression ratio is described.

The mechanical compression ratio is changed using the variable compression ratio control mechanism. A known variable compression ratio control mechanism may be used. Here, an example of a known variable compression ratio control mechanism is described.

Figure 16:
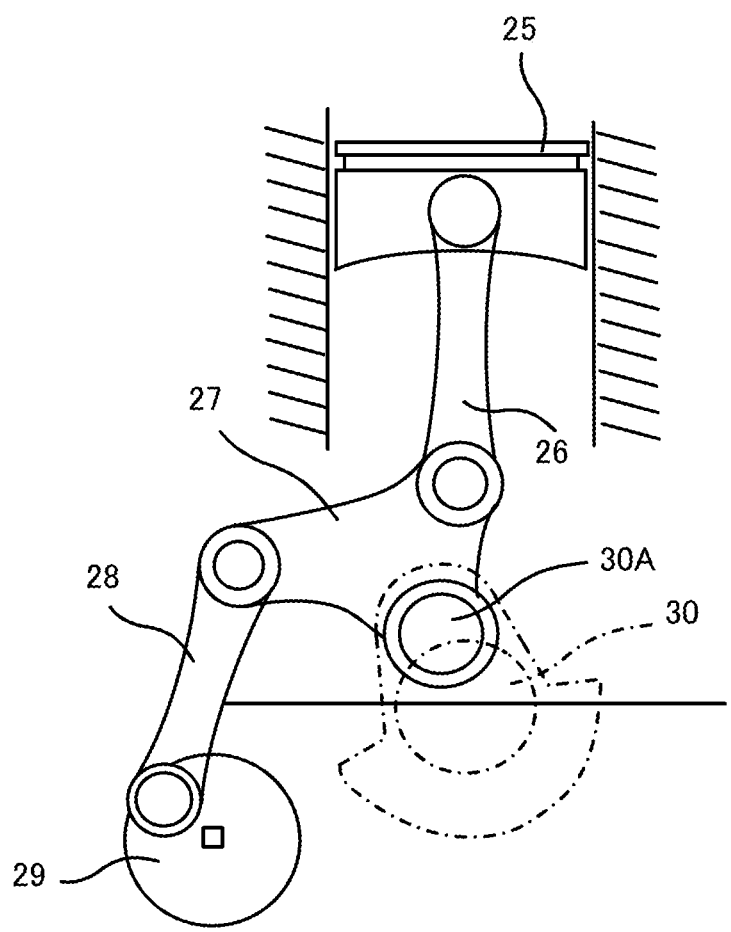
FIG. 16 is a diagram showing an example of a variable compression ratio control mechanism.

FIG. 16 shows a variable compression ratio control mechanism in which a top dead center position of a piston 25 is made variably controllable by coupling the piston 25 and a crankshaft 30 by a plurality of links.

The piston 25 is coupled to the crankshaft 30 via an upper link 26 and a lower link 27. One end of the upper link 26 is rotatably coupled to the piston 25, and the other end is rotatably coupled to the lower link 27. The lower link 27 is rotatably coupled to a crank pin 30A of the crankshaft 30 at a location different from a part coupled to the upper link 26. Further, one end of a control link 28 is rotatably coupled to the lower link 27. The other end of the control link 28 is coupled to a control shaft 29 at a position deviated from a center of rotation.

In the variable compression ratio control mechanism configured as described above, the mechanical compression ratio can be changed by rotating the control shaft 29 by an unillustrated actuator or the like. For example, if the control shaft 29 is rotated by a predetermined angle in a counterclockwise direction in FIG. 16, the lower link 27 rotates in the counterclockwise direction in FIG. 16 about the crank pin 30A via the control link 28. As a result, the top dead center position of the piston 25 moves upward to increase the mechanical compression ratio. Contrary to this, if the control shaft 29 is rotated by a predetermined angle in a clockwise direction in FIG. 16, the lower link 27 rotates in the clockwise direction in FIG. 16 about the crank pin 30A via the control link 28. As a result, the top dead center position of the piston 25 moves downward to reduce the mechanical compression ratio.

The flow chart is described again.

A switch is made to the homogeneous FIR control in Step S150 because the combustion stability can be ensured with the homogeneous combustion even if the fuel spray pattern changes due to the accumulation of deposits. However, since a retardation amount of the ignition timing capable of ensuring the combustion stability is smaller in the case of the homogeneous combustion than in the case of the stratified combustion, the exhaust temperature becomes lower than in the stratified FIR control if the switch is made to the homogeneous FIR control. Thus, a time until the exhaust gas purifying catalysts are activated becomes longer and, as a result, emission performance is reduced. On the other hand, if the mechanical compression ratio is increased, the combustion stability is easily ensured, wherefore the ignition timing can be more retarded. Accordingly, the combustion stability and a sufficient ignition timing retardation amount are ensured and a reduction in emission performance is suppressed by switching to the homogeneous FIR control and increasing the mechanical compression ratio.

In Step S160, the controller 50 determines whether or not a predetermined time has elapsed and performs a processing of Step S170 upon the elapse of the predetermined time. The predetermined time here is a time set on the basis of a time required to blow off deposits with the fuel pressure increased, which is obtained in advance by an experiment or the like and is, for example, about several seconds.

In Step S170, the controller 50 reduces the fuel pressure and the mechanical compression ratio and switches to the stratified FIR control. Then, in Step S180, the controller 50 determines whether or not the combustion stability is smaller than the target value, i.e. whether or not the combustion stability is ensured. This routine is directly ended if the combustion stability is ensured, whereas return is made to Step S130 unless the combustion stability is ensured.

As described above, if the combustion stability cannot be ensured in the stratified FIR control due to the accumulation of deposits, the controller 50 executes the deposit removal control while ensuring the combustion stability and the emission performance by switching to the homogeneous FIR control and increasing the mechanical compression ratio. Upon the elapse of the predetermined time, whether or not the combustion stability is ensured is confirmed after the deposit removal control is finished, the mechanical compression ratio is reduced and return is made to the stratified FIR control. If the combustion stability is not ensured here, a switch is made to the homogeneous FIR control again, the mechanical compression ratio is increased and the deposit removal control is executed.

Figure 17:
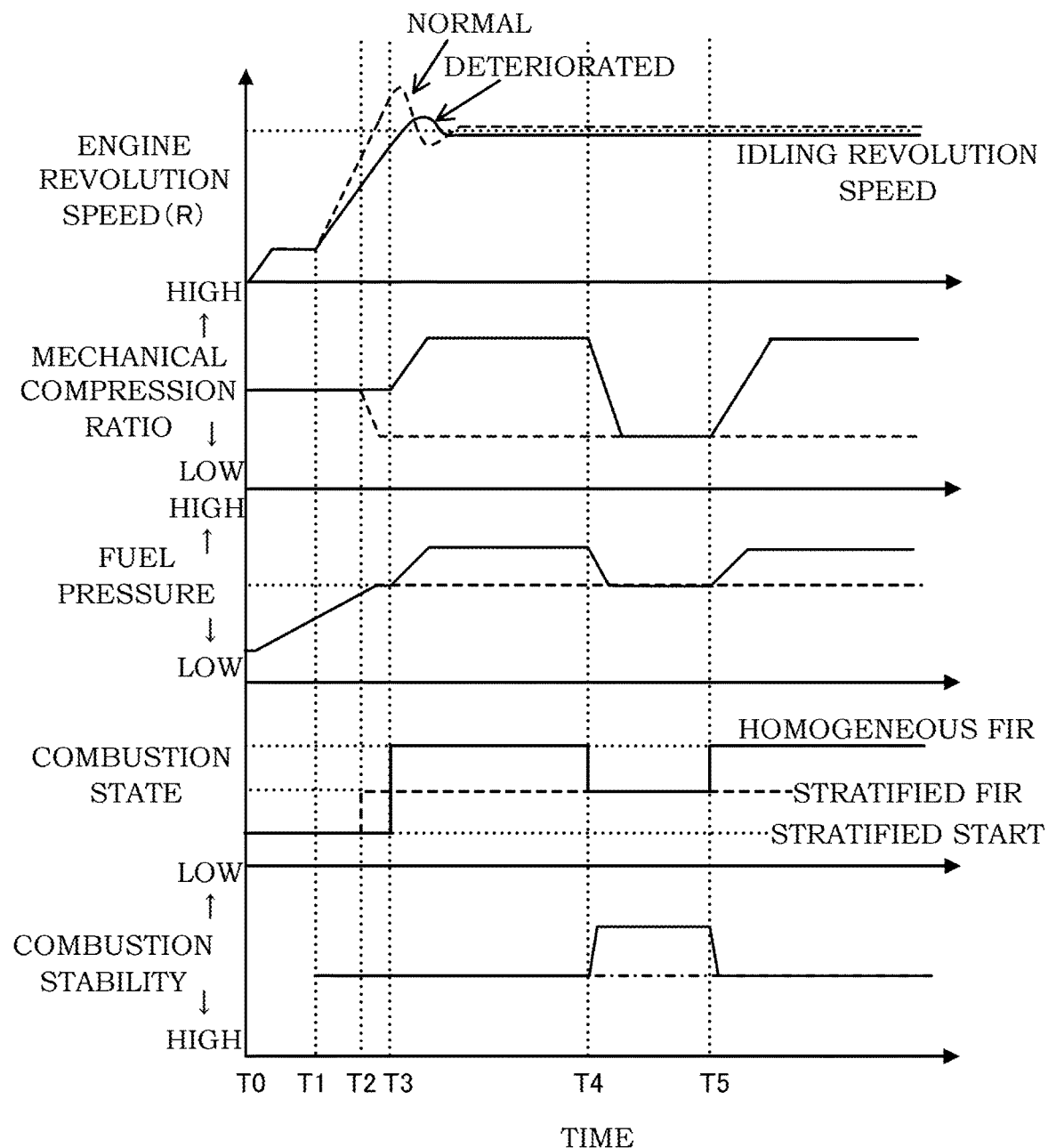
FIG. 17 is a timing chart when the control routine of FIG. 16 is executed.

FIG. 17 is a timing chart when the above control routine is executed.

Broken lines in FIG. 17 represent a state where no deposit is attached (hereinafter, also referred to as a normal state) and solid lines represent a state where deposits are attached (hereinafter, also referred to as a deteriorated state).

When an engine start is determined and cranking is started at timing T0, an engine revolution speed R increases to a predetermined revolution speed and is maintained at that revolution speed. At timing T1, combustion starts and the engine revolution speed R starts increasing again. Further, as the engine revolution speed increases, a rotation speed of the fuel injection pump 15 driven by the internal combustion engine 10 also increases, wherefore the fuel pressure increases.

The engine revolution speed R increases according to the start of combustion both in the normal state and in the deteriorated state, and converges to an idling revolution speed after overshooting once. The aforementioned dR/dt is an upward gradient of the revolution speed from timing T1 to timing T2. As described above, the upward gradient is smaller in the deteriorated state than in the normal state. It should be noted that a time from timing T1 to timing T2 may be arbitrarily set. For example, a time until the engine revolution speed R reaches 1000 [rpm] in the normal state is measured in advance and this time is set.

At timing T2, the controller 50 calculates dR/dt and determines whether the state is the normal state or the deteriorated state. In the normal state, the controller 50 switches from the stratified combustion control for start to the stratified FIR control and reduces the mechanical compression ratio from a value for start to a value for stratified FIR control. In contrast, in the deteriorated state, the controller 50 switches from the stratified combustion control for start to the homogeneous FIR control, increases the mechanical compression ratio from the value for start to a value for homogeneous FIR control and further increases the fuel pressure for the deposit removal control at timing T3. In this way, the combustion stability similar to that in the normal state is ensured even in the deteriorated state.

It should be noted that timing T3 is a timing at which the engine revolution speed R in the deteriorated state becomes the engine revolution speed R in the normal state at timing T2. This is because the combustion stability cannot be ensured if the stratified combustion control for start is finished without the engine revolution speed sufficiently increasing.

At timing T4 reached after the elapse of a predetermined time following the switch to the homogeneous FIR control, the combustion state is switched to the stratified FIR control and the mechanical compression ratio and the fuel pressure are reduced to values for stratified FIR control. At timing T5, the controller 50 determines whether or not the combustion stability is ensured. If the deposits are removed by the deposit removal control, a determination that the combustion stability is ensured is obtained by this determination and the controller 50 continues the stratified FIR control. On the other hand, unless the deposits are removed, the combustion stability is reduced as shown in FIG. 17. In this case, the controller 50 switches to the homogeneous FIR control again and increases the mechanical compression ratio and the fuel pressure.

As described above, in the present embodiment, an actual behavior, which is an actual changing behavior of the engine revolution speed at an engine start, is compared to the reference behavior set in advance. If the actual behavior is different from the reference behavior, a switch is made from the stratified combustion in which the fuel sprays injected from the fuel injection valve 12 and staying around the ignition plug 11 are directly spark-ignited to the homogeneous combustion in which the homogeneous air-fuel mixture is formed in the combustion chamber and the fuel is burned, and the mechanical compression ratio of the internal combustion engine 10 is set higher than that at which the actual behavior and the reference behavior match. By switching to the homogeneous combustion, the combustion stability can be ensured in a situation where the combustion stability cannot be ensured by the stratified combustion and, further, a sufficient ignition timing retardation amount can be ensured by increasing the mechanical compression ratio. Therefore, a reduction in emission performance can be suppressed.

In the present embodiment, the behavior of the engine revolution speed to be compared is the upward gradient of the engine revolution speed after the internal combustion engine starts combustion. If deposits are accumulated on the tip of the fuel injection valve 12, a desired stratified air-fuel mixture cannot be formed at a start and combustion is slow. Thus, an increase of the engine revolution speed is delayed as compared to the normal state. In the present embodiment, the presence or absence of the accumulation of deposits can be precisely determined utilizing this property.

In the present embodiment, the deposit removal control for removing the deposits attached to the tip of the fuel injection valve 12 is executed as the combustion is switched. In this way, the combustion stability can be improved.

The deposit removal control in the present embodiment is a control for increasing the fuel injection pressure as compared to the case where the actual behavior and the reference behavior match. Since deposits are blown off by injecting the fuel at a high fuel pressure, the combustion stability can be improved without stopping the operation of the internal combustion engine 10 and without adding a new device.

In the present embodiment, a switch is made from the homogeneous combustion to the stratified combustion after the deposit removal control is executed for the predetermined time. Specifically, after the deposits are removed, the compression ratio is reduced to return to the stratified FIR control as in the normal state. In this way, emission performance as in the normal state can be obtained.

Although the embodiment of the present invention has been described above, the above embodiment is merely an illustration of one application example of the present invention and is not intended to limit the technical scope of the present invention to the specification configuration of the above embodiment.

The invention claimed is:

1. A control method for an internal combustion engine with:
   a fuel injection valve configured to directly inject fuel into a cylinder; and
   an ignition plug configured to directly spark-ignite the fuel injected from the fuel injection valve;
   the control method comprising:
   comparing an actual behavior to a reference behavior set in advance, the actual behavior being an actual changing behavior of an engine revolution speed at an engine start; and
   determining, based on a result of the comparison, whether the actual behavior is different from the reference behavior;
   in response to determining that the actual behavior is different from the reference behavior,
      switching from a stratified combustion in which a fuel spray injected from the fuel injection valve and staying around the ignition plug is directly spark-ignited to a homogeneous combustion in which a homogeneous air-fuel mixture is formed in a combustion chamber and the fuel is burned, and
      increasing a mechanical compression ratio of the internal combustion engine as compared to the case where the actual behavior and the reference behavior match, and executing a deposit removal control for removing any deposit attached to a tip of the fuel injection valve, wherein the deposit removal control is a control for increasing a fuel injection pressure as compared to the case where the actual behavior and the reference behavior match;
   in response to determining that the actual behavior and the reference behavior match, executing a stratified fast idle control in which the stratified combustion is executed with a retardation of ignition timing of the ignition plug without executing the deposit removal control; and
   executing a stratified combustion control for start from a start of cranking of the engine until the stratified fast idle control is performed, wherein in the stratified combustion control, the stratified combustion is executed without retardation of the ignition timing of the ignition plug,
   wherein the fuel injection valve has a plurality of injection holes that form a stratified air-fuel mixture by injecting fuel from the injection holes toward a periphery of the ignition plug.

2. The control method for an internal combustion engine according to claim 1, wherein:
   the actual behavior is an upward gradient of the engine revolution speed after the internal combustion engine starts combustion.

3. The control method for an internal combustion engine according to claim 1, wherein:
   a switch is made from the homogeneous combustion to the stratified combustion after the deposit removal control is executed for a predetermined time.

4. A control device for an internal combustion engine, comprising:
   a fuel injection valve configured to directly inject fuel into a cylinder;
   an ignition plug configured to directly spark-ignite the fuel injected from the fuel injection valve;
   a sensor configured to obtain an engine revolution speed;
   a variable compression ratio control mechanism configured to change a mechanical compression ratio; and
   a control unit configured to control the fuel injection valve, the ignition plug and the variable compression ratio control mechanism,
   wherein the control unit is configured to:
      compare an actual behavior of the engine revolution speed at an engine start to a reference behavior set in advance, the actual behavior being an actual changing behavior of the engine revolution speed at an engine start;
      determine, based on a result of the comparison, whether the actual behavior is different from the reference behavior; and
      in response to determining that the actual behavior is different from the reference behavior,
         switch from a stratified combustion in which a fuel spray injected from the fuel injection valve and staying around the ignition plug is directly spark-ignited to a homogeneous combustion in which a homogeneous air-fuel mixture is formed in a combustion chamber and the fuel is burned, and increase a mechanical compression ratio of the internal combustion engine as compared to the case where the actual behavior and the reference behavior match, and execute a deposit removal control for removing any deposit attached to a tip of the fuel injection valve, wherein the deposit removal control is a control for increasing a fuel injection pressure as compared to the case where the actual behavior and the reference behavior match;

in response to determining that the actual behavior and the reference behavior match, execute a stratified fast idle control in which the stratified combustion is executed with a retardation of ignition timing of the ignition plug without executing the deposit removal control; and execute a stratified combustion control for start from a start of cranking of the engine until the stratified fast idle control is performed, wherein in the stratified combustion control, the stratified combustion is executed without retardation of the ignition timing of the ignition plug, wherein the fuel injection valve has a plurality of injection holes that form a stratified air-fuel mixture by injecting fuel from the injection holes toward a periphery of the ignition plug.

\* \* \* \* \*